April 12, 1960 L. SCHMID 2,932,373
SYNCHRONIZING MECHANISM FOR CHANGE-SPEED GEARS
Filed Feb. 5, 1958 2 Sheets-Sheet 1

INVENTOR
Leopold Schmid

ATTORNEYS

April 12, 1960 L. SCHMID 2,932,373
SYNCHRONIZING MECHANISM FOR CHANGE-SPEED GEARS
Filed Feb. 5, 1958 2 Sheets-Sheet 2

INVENTOR
Leopold Schmid

ATTORNEYS

United States Patent Office 2,932,373
Patented Apr. 12, 1960

2,932,373

SYNCHRONIZING MECHANISM FOR CHANGE-SPEED GEARS

Leopold Schmid, Stuttgart, Germany, assignor to Dr. Ing. h. c. F. Porsche K.-G., Stuttgart-Zuffenhausen, Germany Application February 5, 1958, Serial No. 713,478

Claims priority, application Germany July 10, 1957

13 Claims. (Cl. 192—53)

This invention relates to improvements in synchronizing mechanisms for change-speed gear trains provided with clutch carriers, especially for motor vehicles. More particularly, the invention relates to such change-speed gear trains provided with resilient split synchronizing rings which are subjected to the influence of locking devices for increasing their servo action, the locking devices being arranged between each of the resilient split synchronizing rings and the hub of the clutch carrier associated therewith.

It is a known practice to provide thrust rings fitted between synchronizing rings and the hubs of clutch carriers for increasing the servo action of the synchronizing rings. However, constructions of this kind, which insure an adequate synchronization, have the drawback that the bearing force applied is only transmitted to one locally restricted point on the synchronizing ring, or at most, to two locally restricted points if the thrust ring is flattened out. Because of this the friction area of the synchronizing ring is subjected to uneven strain.

In another known constructional form, the tension band is in one piece and acts on the synchronizing ring in both working directions. However, the locking action of this one-piece or closed tension band is so great that, under certain circumstances, self-locking occurs, as a result of which, great shifting power is necessary to overcome the locking action, particularly in attempting to shift into first gear when the vehicle is stationary. Sometimes the locking action of the closed band is such that repeated clutching actions must be taken in order to effect an engagement.

According to the present invention, the foregoing drawbacks are avoided by providing a bent locking member or band for each peripheral or working direction of the synchronizing rings of a change-speed gear system, that is bent locking members which, in their blocked positions, are braced between stops arranged opposite to each other. In this manner an arrangement is provided in which the synchronizing ring, during synchronization, is not subjected to any local bearing pressure, but instead, receives an even presure over a large portion of its circumference, thereby excluding the danger of self-locking occurring. Because of this construction and the results obtained thereby, the working life of the synchronizing rings is increased and at the same time an improved synchronizing action is obtained.

The synchronizing mechanism is simplified structurally and is more readily manufactured from a technical standpoint if the locking members are formed of resilient bands having a basically cylindrical shape and are fitted between the stops in such a manner that their action on the synchronizing rings will be unhampered. The locking bands for each synchronizing ring are preferably of equal dimensions, and together they should extend substantially over the entire working range of the synchronizing ring.

In accordance with a modified construction, the locking band designed to act in one peripheral direction extends over a greater working range or circumference of the synchronizing ring than the locking band which acts in the opposite direction. Thus in the working direction in which a higher synchronizing effort is necessary, for instance for changing from a higher into the next lower gear there is a greater bearing force available. Since the reverse gear change manipulation does not demand so great a synchronizing effort, the synchronizing device does, in fact, match up to the actual conditions.

The locking bands are set off center in relation to the axis of rotation of the synchronizing rings, and are fitted between the stops, by which means the gear shift sleeve can turn axially relative to the synchronizing rings. Thus the engagement of a gear when the vehicle is stationary can be effected without any additional effort or special attention.

A particularly effective synchronous action is obtained if one of the stops (for the locking bands) which lie generally opposite each other, is firmly fixed in the hub of the clutch carrier, and the other stop is slidably mounted and engageable by the synchronizing ring. The locking bands are arranged opposite each other, and when the slidable stop is engaged or struck by the synchronizing ring, it tensions-up the one or the other of the locking bands, depending on the peripheral direction of movement of the synchronizing ring.

The invention will be described in greater detail hereinafter with reference to the accompanying drawings, illustrating two embodiments of the invention by way of example.

Figure 1:
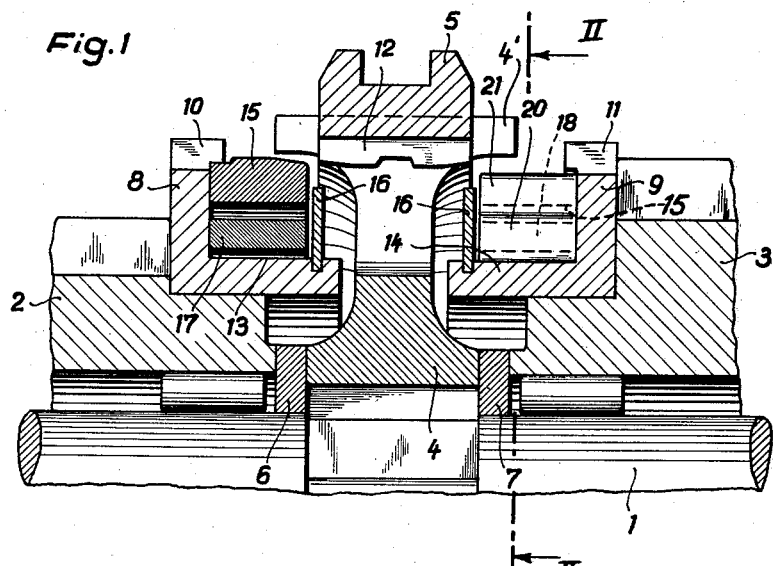
Fig. 1 is a vertical central longitudinal sectional view through a portion of a change-speed gear train provided with the locking members arranged in accordance with the invention.

In the portion of the change-speed gear train shown in Fig. 1, the gear wheels 2 and 3 of different diameter are mounted for rotation on a driven shaft 1, but are retained against longitudinal displacement on the shaft. These gear wheels are permanently in mesh with gear wheels, not shown, fitted on a driving shaft in a known manner. A sleeve carrier 4 is keyed to the shaft 1 and carries a gear clutch sleeve 5, which is shiftable longitudinally. Stop or abutment discs 6 and 7 are mounted on the shaft 1 between the sleeve carrier 4 and the gear wheels 2 and 3, respectively. Clutch carriers 8 and 9, provided respectively with gear teeth 10 and 11, are fitted respectively on and secured to the hubs of the gear wheels 2 and 3. The shiftable sleeve 5 is provided with internal gear teeth 12, which engage the gear teeth 10 and 11 at the end of a gear shifting operation, depending on the direction in which the sleeve 5 is shifted. The sleeve 5 is keyed to the sleeve carrier 4 in a known manner either by its teeth 12 or by a plurality of guide bars 4', of known types, regularly spaced peripherally around the sleeve carrier 4.

Figure 2:
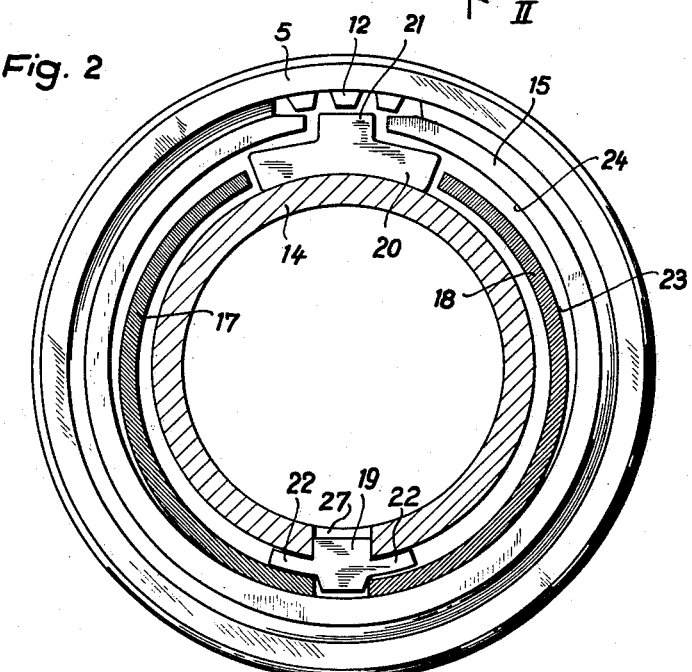
Fig. 2 is a sectional view taken along the line II—II of Fig. 1, on a smaller scale with certain parts omitted, showing the locking members in inactive positions.

The clutch carriers 8 and 9 are provided respectively with hubs 13 and 14 projecting toward the sleeve carrier 4, and a split resilient pre-tensioned synchronizing ring 15 is mounted on each of these hubs 13 and 14 and retained against longitudinal displacement by clamping rings 16 secured respectively in the hubs 13 and 14, as shown in Fig. 1. Pre-tensioning is maintained since the square shoulder on the ring 15 engages under the ends of teeth 10, as shown. Oppositely-arranged resilient locking bands 17 and 18 are mounted between each of the hubs 13 and 14 and the respective synchronizing ring 15. These locking bands 17 and 18 bear on stops 19 and 20 having the structure and arrangement shown in Fig. 2. The locking bands 17 and 18 in Figs. 1, 2 and 3 have the same dimensions and the same cylindrical or arcuate shape and their axes, as shown in Fig. 2, do not coincide with the axis of rotation of the synchronizing rings 15. The stop 19 includes a portion fitting firmly in a slot 27, in each of the hubs 13 and 14, and is provided with lugs 22 extending laterally inside adjacent end portions of the locking bands 17 and 18 for guiding these bands. The adjacent ends of the locking bands lapping the lugs 22 are adapted to engage the portion of the stop 19 arranged therebetween and projecting outwardly with respect to the side lugs 22. On the other hand, the stops 20 are respectively slidably mounted on the hubs 13 and 14 between the other facing ends of the members 17 and 18, and each includes a lug 21 projecting outwardly between the ends of the slotted synchronizing ring 15. There is some play between the stop 20 and the elements 15, 17 and 18, as shown in Fig. 2.

Figure 3:
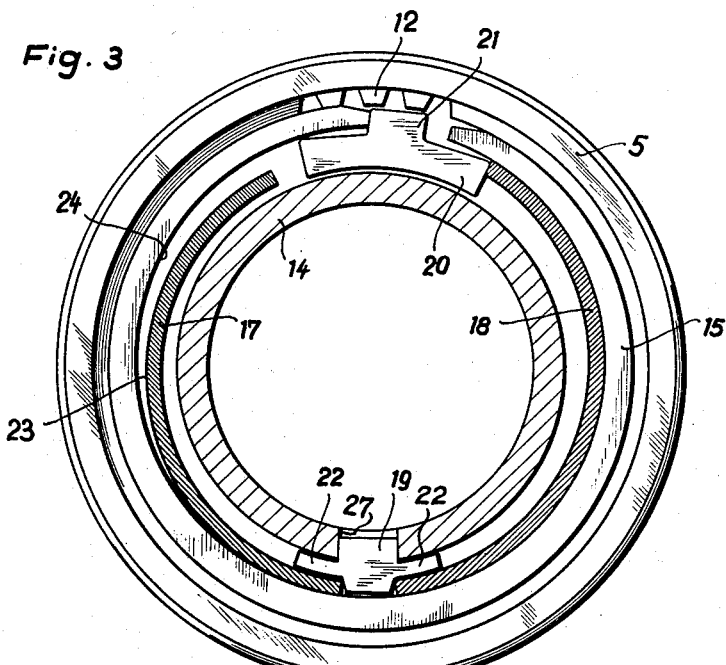
Fig. 3 is a view similar to that of Fig. 2 showing the locking members with cooperating components in an effective working position.

When changing gears, the sleeve 5 is pushed from its neutral position, as shown in Fig. 1, corresponding to an idling position, either to the right or to the left depending on which gear is to be engaged. This causes the head surfaces of the teeth 12 of the sleeve 5 to come into frictional engagement with the peripheral surface of one of the synchronizing rings 15 thereby causing the ring to be driven around by the rotating sleeve 5 which is being rotated by the shaft 1. The synchronizing ring engaged by the teeth 12 of the sleeve 5 is driven around until such time as, depending on the direction of rotation, one of its ends encounters the lug 21 of the stop 20. The completed movements are illustrated in Fig. 3, for a clockwise rotation, from which it will be seen that when the synchronizing ring 15 engages the lug 21, the stop 20 is slidably moved on the hub 14 into engagement with the adjacent end of the locking band 18. The rotary movement applied to the synchronizing ring 15 is now applied to the locking band 18 via the stop 20, but relative movement of the band 18 is prevented by the stop 19.

The applied force eventually starts the rotation of the hub 14 and the gear wheel 3, but during the application of the force applied to the synchronizing ring 15, it is caused to exert a force on the stop 19, by which action the applied force resulting from its own static tension is increased by the measure of servo action of the same. At the same time the force exerted by the synchronizing ring on the stop 19 results in the tensioning up of the locking band 18 which has the effect of pressing its outer surface 23 along the entire length of the band against the inner surface 24 of the synchronizing ring 15, as shown in Fig. 3, thus increasing the servo action and giving a short time lag in the synchronizing operation.

In this connection it will be noted that the lower ends of the locking bands 17 and 18 are initially retained in substantial engagement with the inner surface of the ring 15 by the lugs 22, and that when the stop 20 is forced against the opposite end of one of these rings and tensioning pressure is applied, such opposite end slides along the end of the stop 20 to the position as represented for band 18 in Fig. 3. The arcuate-shaped band is thus bent or has its curvature enlarged.

As the locking band 18 is tensioned up to the position represented in Fig. 3, its entire outer surface area is pressed against the inner surface 24 of the synchronizing ring 15. The pressure applied in this way opposes the gear-changing force applied to the shifting of the sleeve 5 to such an extent that it is almost impossible for a person to complete the gear change before synchronization has been established. As soon as synchronization is achieved in the manner described above, that is, when there is no relative rotation between the sleeve 5 and the synchronizing ring 15, the locking band 18 relaxes, away from the ring 15, and the servo action ceases, so that the sleeve 5 can be pushed over the synchronizing ring 15, and its teeth 12 brought into mesh with the teeth 11. When this is achieved or happens, the gear-change operation is accomplished.

The same functions and operations occur when the synchronizing ring 15 is rotated in the opposite direction to drive the stop 20 against the locking band 17.

Figure 4:
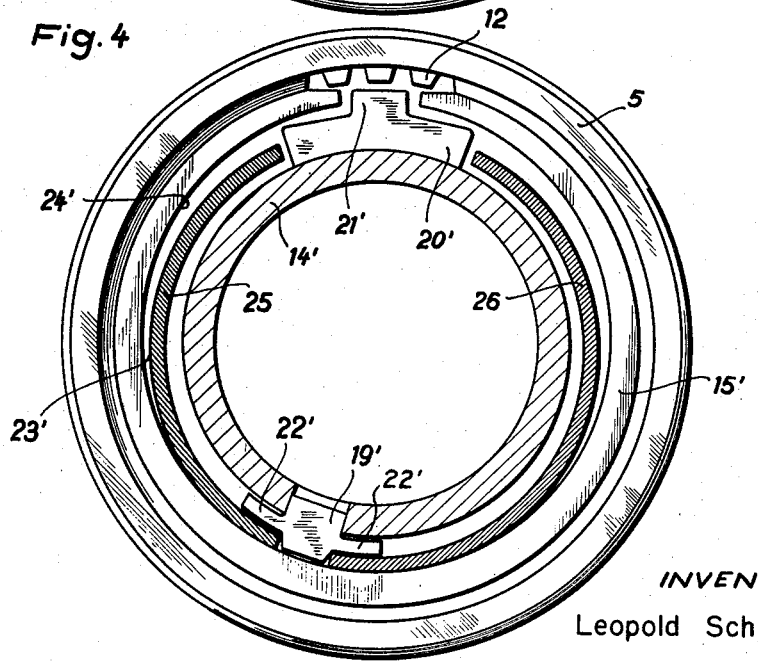
Fig. 4 is a cross-sectional view similar to that of Fig. 2 illustrating a modified form of construction having locking bands of unequal length.

In the modified form of construction shown in Fig. 4, the same components or elements as those shown in Figs. 2 and 3 are designated by the same reference numerals to which a prime has been added. In this construction the equally dimensioned locking bands of Figs. 1 to 3 are replaced by two locking bands 25 and 26 of unequal length and of different locking action, mounted between the synchronizing ring 15' and the hub 14'. The bands 25 and 26, like the bands 17 and 18, are set off-center with respect to the axis of rotation of the synchronizing ring. The longer of the two bands 25 and 26, that is the band 26, is arranged for use in the circumferential direction in which a larger synchronizing effort is required, that is, when changing from a higher to a lower gear. The shorter locking band 25 serves in accordance with the lesser effort required for changing up into the individual gear stages. Since the gear-changing operation for the system of Fig. 4 is effected in the same manner as that described in connection with Figs. 1 to 3, no special description thereof is necessary, it being noted that the longer locking band 26 will engage over a greater surface area of the ring 15' than the locking band 25.

It will be understood that the invention is not restricted to the sleeve gear construction shown in the accompanying drawings. It is possible, for example, to use locking bands of different shape instead of locking bands of the same shape. Furthermore, it is to be understood to be within the scope of the invention to reinforce the ends of the locking bands or to subject the same to a special treatment.

I claim:

1. In a synchronizing mechanism for change-speed gear systems, more particularly for motor vehicles, in which the synchronizing mechanism includes a clutch carrier and a split synchronizing ring carried by the clutch carrier and subjected to the influence of a means for increasing its servo action during synchronization, said split synchronizing ring having ends at the split with a space therebetween, the improvement in which said means includes a pair of locking members respectively acting on the synchronizing ring in each of its circumferential working directions during synchronizing operations, each locking member being bent and located inside the synchronizing ring, and stops located opposite each other inside the synchronizing ring, each locking member being separate from said stops and being braced between said stops with its ends respectively bearing against the stops when in its locking position.

2. A synchronizing mechanism as claimed in claim 1, characterized in that each locking member is a resilient band constituting a cylindrical segment located between said stops.

3. A synchronizing mechanism as claimed in claim 2, in which said pair of locking bands are of substantially equal dimensions and together extend substantially over the entire inner circumference of the synchronizing ring except for said stops.

4. A synchronizing mechanism as claimed in claim 3, characterized in that the axes of the locking bands are located off-center with respect to the axis of the synchronizing ring.

5. A synchronizing mechanism as claimed in claim 4, characterized in that one of said stops is secured in fixed position with respect to the clutch carrier and the other stop is a floating stop and includes a projection extending into the space between the ends of the split synchronizing ring.

6. A synchronizing mechanism as claimed in claim 1, characterized in that the locking members are of unequal length so that one locking member extends along and is adapted to engage a greater part of the inner surface of the synchronizing ring than the other locking member.

7. In a synchronizing mechanism for change-speed gear systems, more particularly for motor vehicles, in which the synchronizing mechanism includes a clutch carrier having a hub, and a split synchronizing ring having spaced ends and mounted in spaced relation around the hub of the clutch carrier, said synchronizing ring being subjected to the influence of a means for increasing its servo action during synchronization, the improvement in which said means includes a pair of arcuate locking members respectively acting on the synchronizing ring in each of its circumferential working directions during synchronizing operations, said locking members being located between the synchronizing ring and the hub of the clutch carrier, a stop for the adjacent ends of said locking members remote from the split in the synchronizing ring, and stop means actuated by rotation of the synchronizing ring in one direction for engaging the other end of the locking member located in advance of the split in the synchronizing ring in the direction of its rotation, said locking members being separate from said stop and said stop means.

8. A synchronizing mechanism as claimed in claim 7, in which said stop is keyed to the hub of the clutch carrier and includes opposite peripherally-extending projections located respectively between the said adjacent ends of the locking members and said hub for retaining said ends adjacent the inner surface of the synchronizing ring.

9. A synchronizing mechanism as claimed in claim 7, in which the stop means is slidable on the hub of the clutch carrier and includes a projection extending between the ends of the split synchronizing ring.

10. In a synchronizing mechanism for change-speed gear systems including a driving member, a driven member, a compressible split resilient spring synchronizing ring carried by one of said members and having ends, and a displaceable clutching means carried by the other member which when brought into engagement with the synchronizing ring is adapted to effect synchronization of said members, the improvement comprising a pair of arcuate locking band-like members disposed opposite each other inside the synchronizing ring for increasing its servo action, a stop means remote from the split in the synchronizing ring and mounted in the member carrying the synchronizing ring, said stop means being engaged by the adjacent ends of said locking members, a second stop means extending between the ends of the synchronizing ring and between the other ends of said locking members, whereby rotation of the synchronizing ring in one circumferential direction drives said second stop into engagement with the adjacent end of the locking member in the path of said second stop causing the outer surface of said locking member to engage the inner surface of the synchronizing ring, said locking members being separate from both of said stop means.

11. A synchronizing mechanism as claimed in claim 10, characterized in that the axes of said locking members are offset with respect to the axis of rotation of the synchronizing ring.

12. In a synchronizing mechanism for change-speed gear systems including a driving member, a driven member, a compressible split resilient spring synchronizing ring carried by one of said members and having spaced ends at the split, and a displaceable clutching means carried by the other member which when brought into engagement with the synchronizing ring is adapted to effect synchronization of said members, the improvement comprising a pair of segmental arcuate locking members disposed opposite each other inside the synchronizing ring for increasing its servo action, each locking member having an end adjacent the position of the split in the synchronizing ring, the other ends of the locking members being in adjacent spaced relation to each other at a position remote from the split in the synchronizing ring, a first stop means anchored in the member carrying the synchronizing ring at said remote position and extending between and being engaged by said other ends of said locking members, a second stop means extending between the ends of the synchronizing ring and between the ends of said locking members located adjacent the split in the synchronizing ring, whereby rotation of the synchronizing ring in one circumferential direction drives said second stop into engagement with the adjacent end of the locking member in the path of said second stop causing said locking member to press against the first stop and its outer surface to engage the inner surface of the synchronizing ring.

13. In a synchronizing mechanism for change-speed gear systems, more particularly for motor vehicles, in which the synchronizing mechanism includes a clutch carrier having a hub, and a split synchronizing ring having spaced ends at the split and mounted in spaced relation around the hub of the clutch carrier, said synchronizing ring being subjected to the influence of a means for increasing its servo action during synchronization, the improvement in which said means for increasing the servo action of the synchronizing ring includes a segmental arcuate locking member acting on the synchronizing ring in at least one of its circumferential directions during a synchronizing operation, a stop anchored to the hub of the clutch carrier at a position remote from the split in the synchronizing ring and projecting into the space between said hub and the synchronizing ring, and a stop means slidably mounted on the hub of the clutch carrier and projecting into the space between the ends of the synchronizing ring, said locking member being separate from the stop and stop means and comprising a resilient bendable member located in the space between the hub of the clutch carrier and the synchronizing ring with one of its ends abutting said stop and its other end located adjacent the stop means, said locking member curving more abruptly than the synchronizing ring and being bendable outwardly during a synchronizing operation so that its outer surface engages the inner surface of the synchronizing ring when the synchronizing ring is rotated in a direction to move the stop means into engagement with and apply force to the adjacent end of the locking member.

References Cited in the file of this patent

FOREIGN PATENTS 1,134,866   France _____ Dec. 10, 1956